(12) United States Patent
Inahara

(10) Patent No.: US 10,381,164 B2
(45) Date of Patent: Aug. 13, 2019

(54) METHOD FOR DRYING ELECTRODE PAIR

(71) Applicant: Junichi Inahara, Osaka (JP)

(72) Inventor: Junichi Inahara, Osaka (JP)

(73) Assignee: ESOEC Corp., Osaka (JP)

( * ) Notice: Subject to any disclaimer, the term of this patent is extended or adjusted under 35 U.S.C. 154(b) by 0 days.

(21) Appl. No.: 14/972,527

(22) Filed: Dec. 17, 2015

(65) Prior Publication Data

US 2016/0104912 A1    Apr. 14, 2016

Related U.S. Application Data

(62) Division of application No. 13/822,727, filed as application No. PCT/JP2011/071672 on Sep. 22, 2011, now Pat. No. 9,318,267.

(30) Foreign Application Priority Data

Sep. 29, 2010  (JP) .................. 2010-219630

(51) Int. Cl.
   *H01G 9/00*     (2006.01)
   *H01G 11/22*    (2013.01)
   (Continued)

(52) U.S. Cl.
   CPC .......... *H01G 9/0029* (2013.01); *H01G 11/22* (2013.01); *H01G 11/84* (2013.01); *H01G 11/86* (2013.01);
   (Continued)

(58) Field of Classification Search
   CPC . Y02E 60/122; Y02E 60/13; Y10T 29/49115; Y10T 29/49108;
   (Continued)

(56) References Cited

U.S. PATENT DOCUMENTS 3,009,979 A * 11/1961 Corren .................. H01M 4/04
                                                    429/217
3,950,460 A    4/1976 Mastrangelo et al.
(Continued)

FOREIGN PATENT DOCUMENTS

CN    1723580 A    1/2006
CN    101399329 A    4/2009
(Continued)

OTHER PUBLICATIONS

Chinese Office Action and English translation thereof dated Nov. 27, 2014.
(Continued)

*Primary Examiner* — Thiem D Phan
(74) *Attorney, Agent, or Firm* — Harness, Dickey & Pierce, P.L.C.

(57) ABSTRACT

A method for drying an electrode pair is disclosed. In at least one embodiment, the method includes preparing a positive electrode by applying a positive electrode material to a current collector; preparing a negative electrode by applying a negative electrode material to a current collector; preparing one set of an electrode pair made up of a positive electrode, a separator, and a negative electrode which are laminated in this order or preparing sets of electrode pairs, the sets being laminated, a separator being provided between the respective sets, each of the electrode pairs being made up of a positive electrode, a separator, and a negative electrode which are laminated in this order; accommodating the electrode pair(s) in a container; and drying the container in which the electrode pair(s) has been accommodated by use of the freeze-drying method.

6 Claims, 7 Drawing Sheets

(51) Int. Cl.
*H01G 11/84* (2013.01)
*H01M 4/04* (2006.01)
*H01M 4/13* (2010.01)
*H01M 10/052* (2010.01)
*H01M 10/058* (2010.01)
*H01M 10/04* (2006.01)
*H01G 11/86* (2013.01)
*H01M 10/0525* (2010.01)

(52) U.S. Cl.
CPC ........... *H01M 4/04* (2013.01); *H01M 4/0404* (2013.01); *H01M 4/13* (2013.01); *H01M 10/04* (2013.01); *H01M 10/049* (2013.01); *H01M 10/052* (2013.01); *H01M 10/058* (2013.01); *H01M 10/0525* (2013.01); *H01M 2220/30* (2013.01); *Y02E 60/122* (2013.01); *Y02E 60/13* (2013.01); *Y02P 70/54* (2015.11); *Y10T 29/417* (2015.01); *Y10T 29/4911* (2015.01); *Y10T 29/49115* (2015.01)

(58) Field of Classification Search
CPC ............ Y10T 29/49224; Y10T 29/417; Y10T 29/4911; H01M 10/058; H01M 10/0565; H01M 6/18; H01M 6/40; H01M 10/04
USPC .................. 29/623.5, 25.03, 623.2, 874, 876
See application file for complete search history.

(56) References Cited

U.S. PATENT DOCUMENTS

| | | |
|---|---|---|
| 5,853,914 A | 12/1998 | Kawakami |
| 6,372,387 B1 | 4/2002 | Kawakami et al. |
| 7,579,112 B2 * | 8/2009 | Chiang ................ G02F 1/1523 |
| | | 204/288 |
| 2003/0157391 A1 | 8/2003 | Coleman et al. |
| 2003/0170539 A1 | 9/2003 | Schoonmaker et al. |

FOREIGN PATENT DOCUMENTS

| | | |
|---|---|---|
| JP | 10241742 A | 9/1998 |
| JP | 2001143697 A | 5/2001 |
| JP | 2005267997 A | 9/2005 |
| JP | 2007042370 A | 2/2007 |
| JP | 2008156138 A | 7/2008 |
| JP | 2008179521 A | 8/2008 |

OTHER PUBLICATIONS

International Search Report PCT/ISA/210 for International Application No. PCT/JP2011/071672 dated Dec. 19, 2011.
U.S. Office Action dated Mar. 12, 2015 in U.S. Appl. No. 13/822,727.
U.S. Office Action dated Sep. 24, 2015 in U.S. Appl. No. 13/822,727.
U.S. Advisory Action dated Dec. 4, 2015 in U.S. Appl. No. 13/822,727.
Non-Final Office Action dated Jan. 12, 2017 for co-pending U.S. Appl. No. 14/972,601.

* cited by examiner

METHOD FOR DRYING ELECTRODE PAIR

CROSS-REFERENCE TO RELATED APPLICATIONS

This application is a Divisional of U.S. patent application Ser. No. 13/822,727, filed Mar. 13, 2013, which is a U.S. National Phase under 35 U.S.C. § 371 of PCT International Application No. PCT/JP2011/071672 which has an International filing date of Sep. 22, 2011, which claims priority to Japanese Application No. 2010219630, filed on Sep. 29, 2010, the entire contents of each of which are hereby incorporated by reference.

TECHNICAL FIELD

The present invention relates to a method for drying an electrode pair, a method for manufacturing a lithium-ion secondary battery, a method for manufacturing an electric double-layer capacitor, and a method for manufacturing a lithium-ion capacitor.

BACKGROUND ART

Lithium-ion secondary batteries have been widely used in recent years since the lithium-ion secondary batteries are high in energy density and can be charged and discharged. The lithium-ion secondary batteries, which are low in memory effect, are used in, for example, mobile phones, which are frequently charged. Note that the memory effect is a degradation phenomenon as below. If a battery which has not been fully discharged is repeatedly recharged, discharge voltage remarkably declines though the battery has not been fully discharged. As a result, storage capacity of the battery appears to have declined. The term "memory effect" comes from "memorizing" remaining battery level at a time of start of charging.

Broadly speaking, a process of manufacturing a lithium-ion secondary battery includes the following steps: 1. a step of applying a positive-electrode active material to an electrode foil to prepare a positive electrode, and applying a negative-electrode active material to an electrode foil to prepare a negative electrode; 2. a step of drying the positive electrode and the negative electrode which are in roll forms; 3. a step of stacking the positive electrode, the negative electrode, and a separator, which is interposed between the positive electrode and the negative electrode, so as to prepare an electrode pair; 4. a step of accommodating the electrode pair thus prepared in a container and then drying the electrode pair; 5. a step of preparing a cell by injecting an electrolyte solution into the container in which the dried electrode pair is accommodated; and 6. a step of sealing the cell.

In each of the steps 2 and 4, vacuum drying is carried out. The reason why drying is carried out in these two steps is that a large amount of moisture adhered to the positive electrode and the negative electrode cannot be satisfactorily removed by drying in only one of the steps 2 and 4. Residual moisture in the positive electrode and the negative electrode causes, for example, a problem such that the residual moisture mixed into an electrolyte solution results in decomposition of the electrolyte solution, or a problem such that a positive-electrode active material is altered in quality. Therefore, removal of moisture is crucial.

Note here that a technique for removing moisture in a short time is disclosed in Patent Literature 1. Patent Literature 1 relates to a method for manufacturing a battery including a separator which is constituted by an insulating material particulate aggregate layer.

CITATION LIST

Patent Literature

Patent Literature 1
Japanese Patent Application Publication, Tokukaihei, No. 10-241742 (Publication Date: Sep. 11, 1998)

SUMMARY OF INVENTION

Technical Problem

The above conventional drying method has problems of requiring long hours of drying and of causing creases in a separator.

Specifically, a drying temperature in the step 2, which is not higher than a melting-point of binders for the positive electrode and the negative electrode, generally ranges from 130° C. to 200° C. Moreover, in the step 2 of drying the positive electrode and the negative electrode in roll forms, it takes 5 to 20 hours to completely dry the positive electrode and the negative electrode to their wound cores. As such, the step 2 involves long hours of drying at high temperatures, and thus has a problem of high running costs.

Meanwhile, the long hours of drying is also problematic in the step 4. Although depending on what is to be dried, the step 4 requires 5 to 24 hours of drying. Such an extremely long drying time is a bottleneck in the whole process. Especially, since the step 4 is usually carried out in a dry room, long hours of drying also has a major impact on manufacturing costs.

Furthermore, a drying temperature in the step 4, which is not higher than a heatproof temperature of the separator, generally ranges from 70° C. to 80° C. The drying step is highly important because the drying step, which is carried out immediately prior to injection of the electrolyte solution with respect to the electrode pair, is a final stage of the removal of moisture. Although the drying temperature is not higher than the heatproof temperature of the separator, a problem arises such that creases can occur in the separator due to long hours of heat application to the separator or due to partially varied temperatures of the separator. This causes decrease in yield of an end product. The above problems, which relate to manufacture of a lithium-ion secondary battery, are also important in the manufacture of an electric double-layer capacitor and a lithium-ion capacitor.

According to Patent Literature 1, in which a separator is constituted by an insulating material particulate aggregate layer, it is possible to carry out drying at temperatures of not lower than 100° C. However, drying time is 12 hours, which cannot be regarded as a short time.

The present invention has been made in view of the above problems, and an object of the present invention is to provide a method for drying an electrode pair, a method for manufacturing a lithium-ion secondary battery, a method for manufacturing an electric double-layer capacitor, and a method for manufacturing a lithium-ion capacitor, all of which methods (i) cause no defects, such as creases, in a separator and (ii) enable reduction of a time for drying an electrode pair.

Solution to Problem

In order to attain the object, a method for drying an electrode pair in accordance with the present invention includes the steps of: preparing a positive electrode by applying a positive electrode material to a current collector; preparing a negative electrode by applying a negative electrode material to a current collector; preparing one set of an electrode pair made up of a positive electrode, a separator, and a negative electrode which are laminated in this order or preparing sets of electrode pairs, the sets being laminated, a separator being provided between the respective sets, each of the electrode pairs being made up of a positive electrode, a separator, and a negative electrode which are laminated in this order; accommodating the electrode pair(s) in a container, and at least one of (i) drying at least one of the positive electrode(s) and the negative electrode(s) by use of a freeze-drying method and (ii) drying the container in which the electrode pair(s) has been accommodated by use of the freeze-drying method.

According to the above-described invention, a freeze-drying method is used for drying an electrode pair and other elements. The freeze-drying method is arranged as below. The electrode pair and other elements are frozen and then subjected to a high vacuum. Under such a situation, when the electrode pair is heated by supply of heat for sublimation, sublimation occurs so that ice formed on the frozen electrode pair and other elements changes to a vapor. As a result, it is possible to reduce a drying time as compared with a drying time required for a conventional vacuum drying. Accordingly, manufacturing costs of electrode pairs can be cut down. Furthermore, the aforementioned drying method adopts a low drying temperature and is thus less likely to cause creases in a separator provided in the electrode pair. This allows a reduction in the occurrence of defective products. It follows that yield is improved. As such, the improvement in yield and the reduction in the drying time can greatly cut down manufacturing costs.

In order to attain the object, a method for manufacturing a lithium-ion secondary battery in accordance with the present invention includes the steps of: preparing a positive electrode by applying a positive electrode material to a current collector; preparing a negative electrode by applying a negative electrode material to a current collector; preparing one set of an electrode pair made up of a positive electrode, a separator, and a negative electrode which are laminated in this order or preparing sets of electrode pairs, the sets being laminated, a separator being provided between the respective sets, each of the electrode pairs being made up of a positive electrode, a separator, and a negative electrode which are laminated in this order; accommodating the electrode pair(s) in a container; injecting an electrolyte solution into the container in which the electrode pair(s) has been accommodated; sealing the container into which the electrolyte solution has been injected; and at least one of (i) drying at least one of the positive electrode(s) and the negative electrode(s) by use of a freeze-drying method and (ii) drying the container in which the electrode pair(s) has been accommodated by use of the freeze-drying method.

The above-described invention includes the step of freezing and drying an electrode pair and the like by use of a freeze-drying method. It is therefore possible to cut down manufacturing costs of a lithium-ion secondary battery (end product), by reducing the drying time required to dry the electrode pair. Furthermore, according to the step of freezing and drying an electrode pair by use of the freeze-drying method, creases are less likely to occur in a separator provided in the electrode pair. This allows a reduction in the occurrence of defective products. It follows that yield is improved. As such, a combination of (i) the improvement in yield and (ii) the reduction in the drying time can greatly cut down manufacturing costs.

In order to attain the object, a method for manufacturing an electric double-layer capacitor in accordance with the present invention, includes the steps of: preparing a positive electrode by applying a positive electrode material to a current collector; preparing a negative electrode by applying a negative electrode material to a current collector; preparing one set of an electrode pair made up of a positive electrode, a separator, and a negative electrode which are laminated in this order or preparing sets of electrode pairs, the sets being laminated, a separator being provided between the respective sets, each of the electrode pairs being made up of a positive electrode, a separator, and a negative electrode which are laminated in this order; accommodating the electrode pair(s) in a container; injecting an electrolyte solution into the container in which the electrode pair(s) has been accommodated; sealing the container into which the electrolyte solution has been injected; and at least one of (i) drying at least one of the positive electrode(s) and the negative electrode(s) by use of a freeze-drying method and (ii) drying the container in which the electrode pair(s) has been accommodated by use of the freeze-drying method.

The above-described invention includes the step of freezing and drying an electrode pair and the like by use of a freeze-drying method. It is therefore possible to cut down manufacturing costs of an electric double-layer capacitor (end product), by reducing the drying time required to dry the electrode pair. Furthermore, according to the step of freezing and drying an electrode pair by use of the freeze-drying method, creases are less likely to occur in a separator provided in the electrode pair. This allows a reduction in the occurrence of defective products. It follows that yield is improved. As such, a combination of (i) the improvement in yield and (ii) the reduction in the drying time can greatly cut down manufacturing costs.

In order to attain the object, a method for manufacturing a lithium-ion capacitor in accordance with the present invention includes the steps of: preparing a positive electrode by applying a positive electrode material to a current collector; preparing a negative electrode by applying a negative electrode material to a current collector; providing metallic lithium to one set of an electrode pair made up of a positive electrode, a separator, and a negative electrode which are laminated in this order or to sets of electrode pairs, the sets being laminated, a separator being provided between the respective sets, each of the electrode pairs being made up of a positive electrode, a separator, and a negative electrode which are laminated in this order; accommodating, in a container, the electrode pair(s) having the metallic lithium provided thereto; injecting an electrolyte solution into the container in which the electrode pair(s) having the metallic lithium provided thereto has been accommodated; sealing the container into which the electrolyte solution has been injected; and at least one of (i) drying at least one of the positive electrode(s) and the negative electrode(s) by use of a freeze-drying method and (ii) drying the container in which the electrode pair(s) having the metallic lithium provided thereto has been accommodated by use of the freeze-drying method.

The above-described invention includes the step of freezing and drying an electrode pair and the like by use of a freeze-drying method. It is therefore possible to cut down manufacturing costs of a lithium-ion capacitor (end product), by reducing the drying time required to dry the electrode pair. Furthermore, according to the step of freezing and drying an electrode pair by use of the freeze-drying method, creases are less likely to occur in a separator provided in the electrode pair. This allows a reduction in the occurrence of defective products. It follows that yield is improved. As such, a combination of (i) the improvement in yield and (ii) the reduction in the drying time can greatly cut down manufacturing costs.

Advantageous Effects of Invention

As described above, the method for drying an electrode pair, the method for manufacturing a lithium-ion secondary battery, the method for manufacturing an electric double-layer capacitor, in accordance with the present invention include: the steps of preparing one set of an electrode pair made up of a positive electrode, a separator, and a negative electrode which are laminated in this order or preparing sets of electrode pairs, the sets being laminated, a separator being provided between the respective sets, each of the electrode pairs being made up of a positive electrode, a separator, and a negative electrode which are laminated in this order; and at least one of (i) drying at least one of the positive electrode(s) and the negative electrode(s) by use of a freeze-drying method and (ii) drying a container in which the electrode pair(s) has been accommodated by use of the freeze-drying method.

As described above, the method for manufacturing a lithium-ion capacitor in accordance with the present invention includes: the steps of providing metallic lithium to one set of an electrode pair made up of a positive electrode, a separator, and a negative electrode which are laminated in this order or to sets of electrode pairs, the sets being laminated, a separator being provided between the respective sets, each of the electrode pairs being made up of a positive electrode, a separator, and a negative electrode which are laminated in this order; and at least one of (i) drying at least one of the positive electrode(s) and the negative electrode(s) by use of a freeze-drying method and (ii) drying a container in which the electrode pair(s) having the metallic lithium provided thereto has been accommodated by use of the freeze-drying method.

Therefore, the present invention yields an effect of providing a method for drying an electrode pair, a method for manufacturing a lithium-ion secondary battery, a method for manufacturing an electric double-layer capacitor, and a method for manufacturing a lithium-ion capacitor, all of which methods (i) cause no defects, such as creases, in a separator and (ii) enable reduction of a time for drying an electrode pair.

Figure 2:
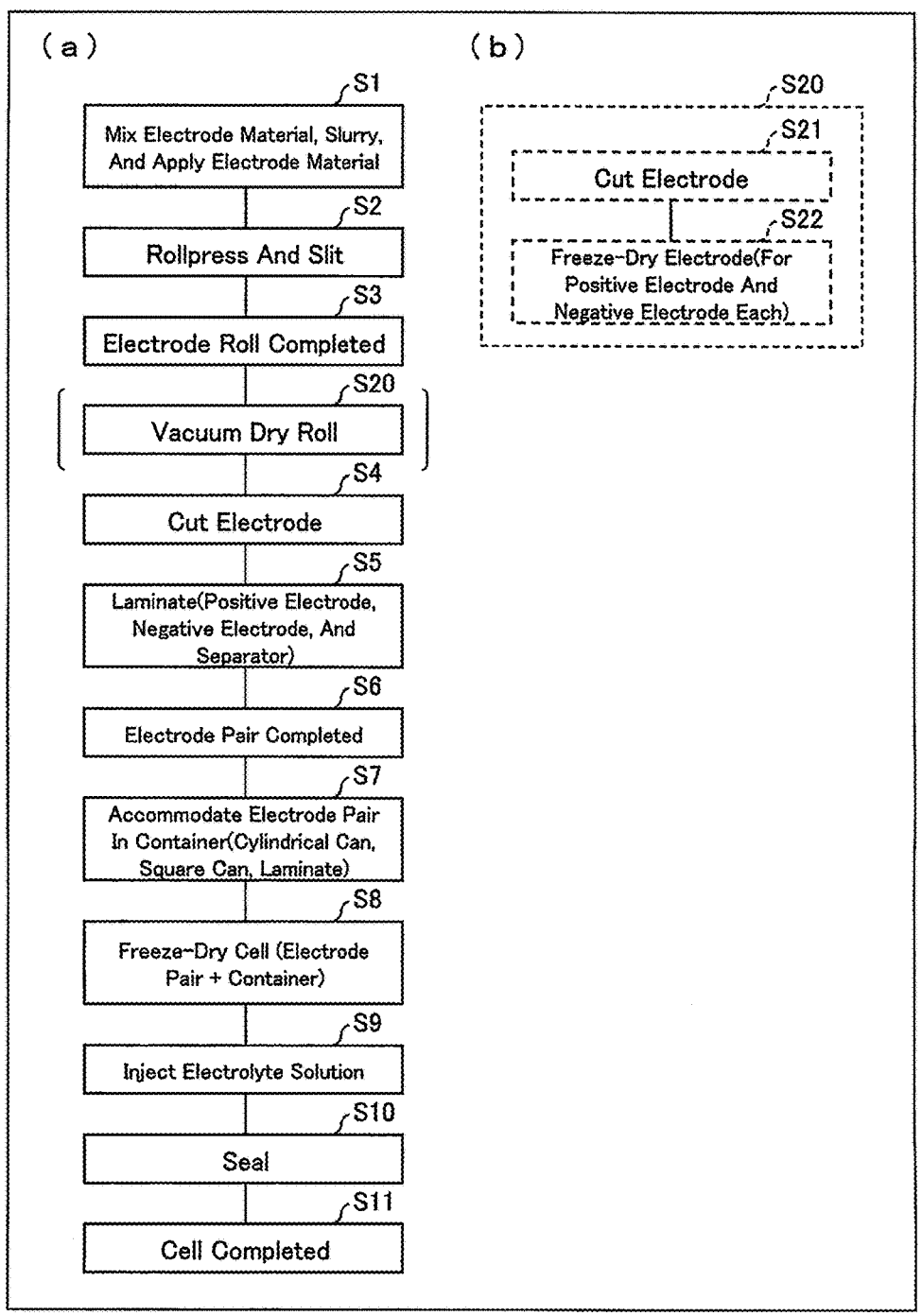

(a) of FIG. 2 is a flowchart showing detailed steps of a method for manufacturing a lithium-ion secondary battery. (b) of FIG. 2 is a flowchart showing details of vacuum drying of an electrode in roll form.

Figure 3:
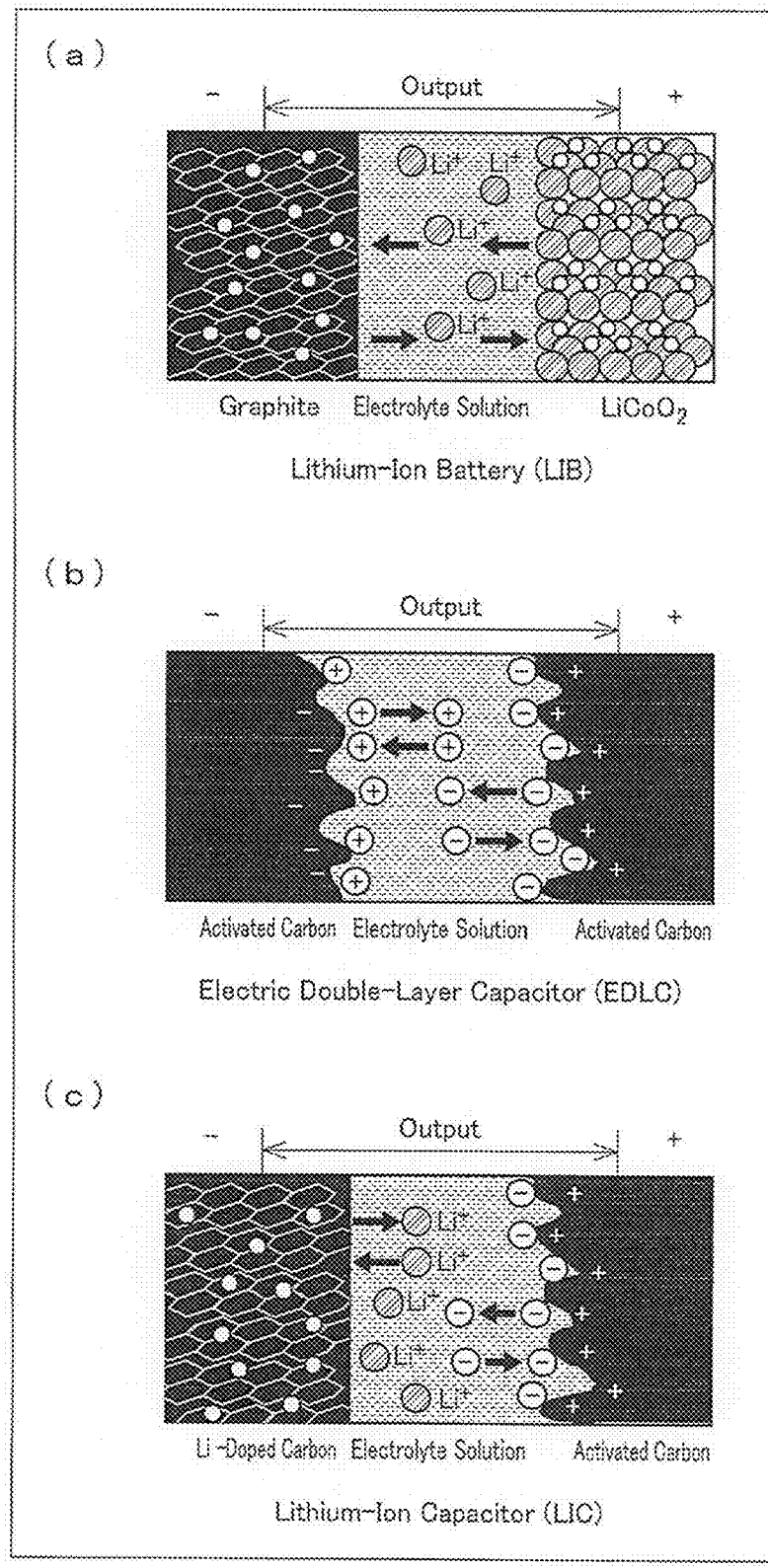

(a) of FIG. 3 schematically shows an arrangement of a lithium-ion secondary battery to which the method for drying an electrode pair is applied. (b) of FIG. 3 schematically shows an arrangement of an electric double-layer capacitor to which the method for drying an electrode pair is applied. (c) of FIG. 3 schematically shows an arrangement of a lithium-ion capacitor to which the method for drying an electrode pair is applied.

Figure 4:
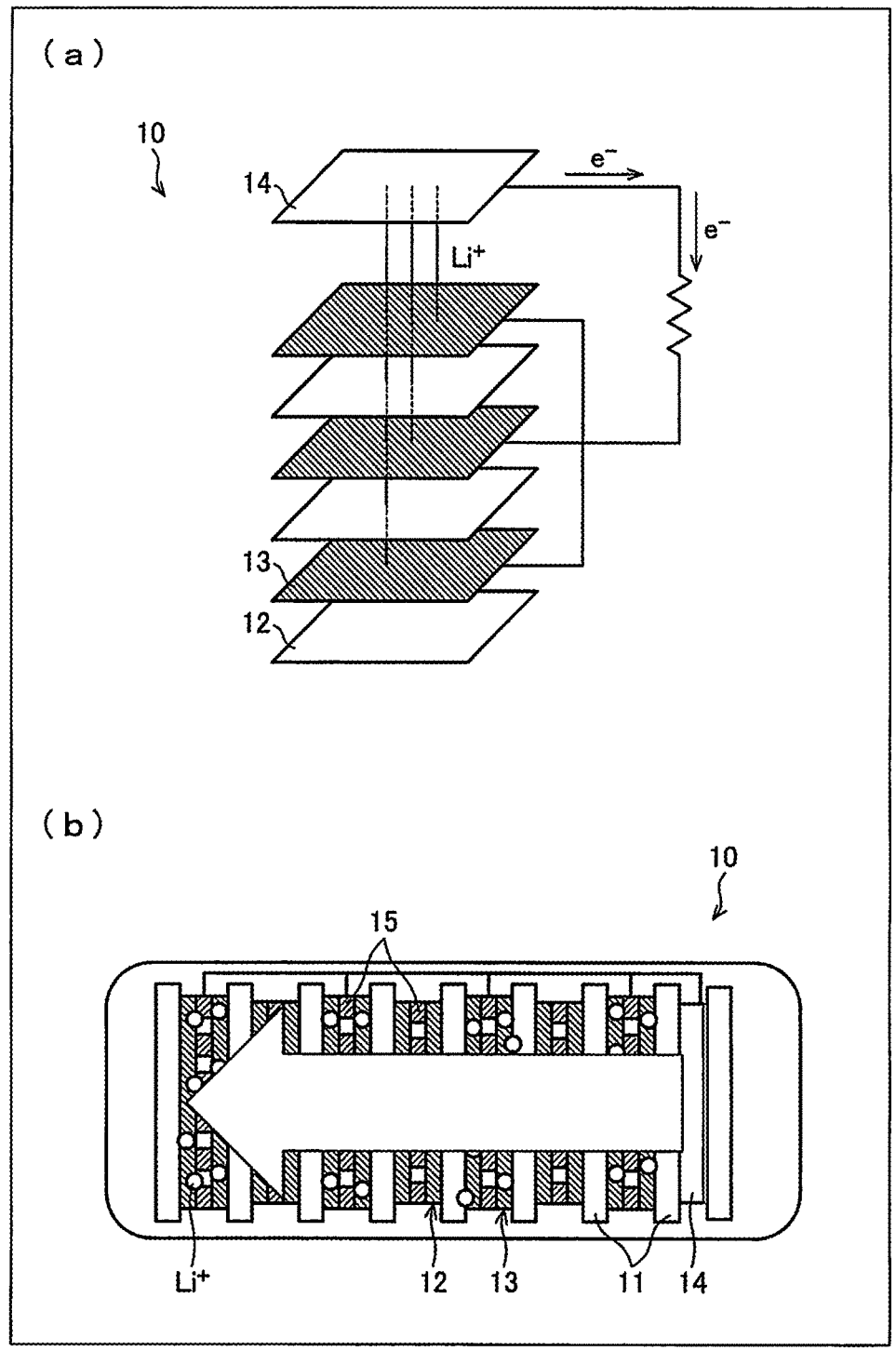

(a) of FIG. 4 is a perspective view showing an arrangement of the lithium-ion capacitor. (b) of FIG. 4 is a cross-sectional view showing a direction of doping of lithium ions in the lithium-ion capacitor.

Figure 5:
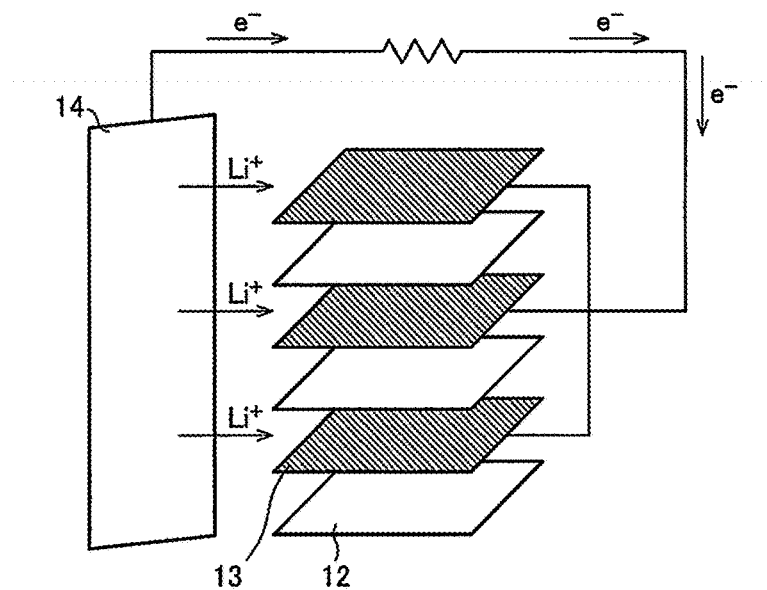

FIG. 5 is a perspective view showing an arrangement of a lithium-ion capacitor of a horizontal doping type.

Figure 6:
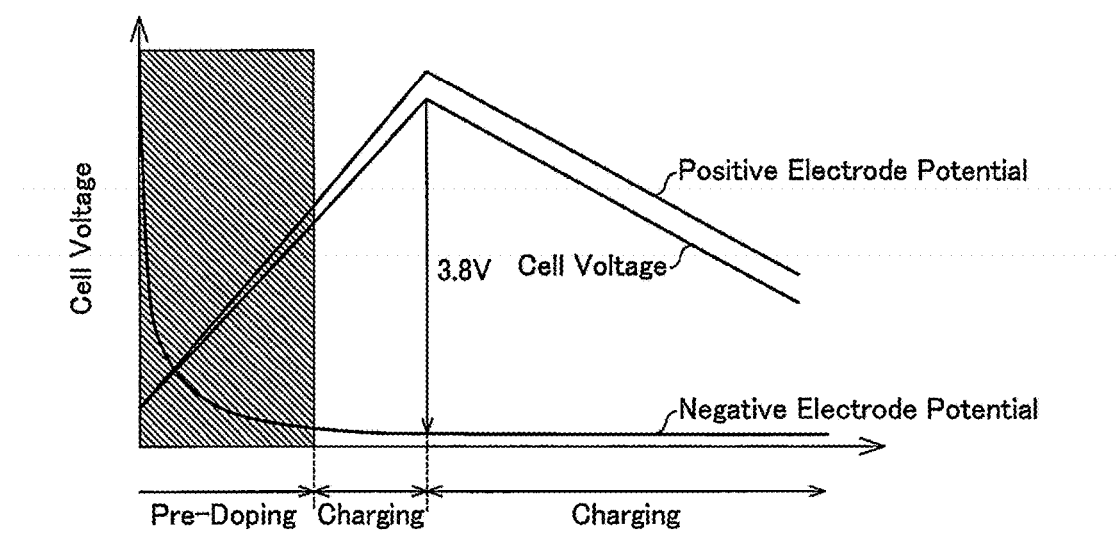

FIG. 6 shows a relationship between potentials of electrodes during charging and discharging of the lithium-ion capacitor.

Figure 7:
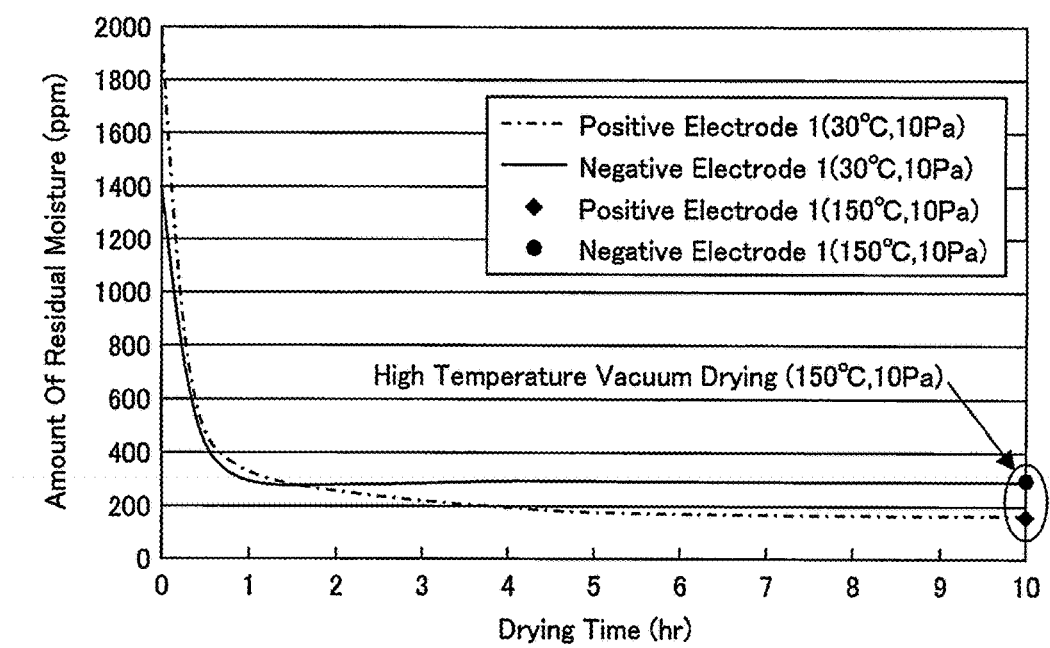

FIG. 7 is a graph showing an example in accordance with the freeze-drying method of the present invention, the graph showing a relationship between a drying time and an amount of residual moisture with respect to a positive electrode and a negative electrode.

Figure 8:
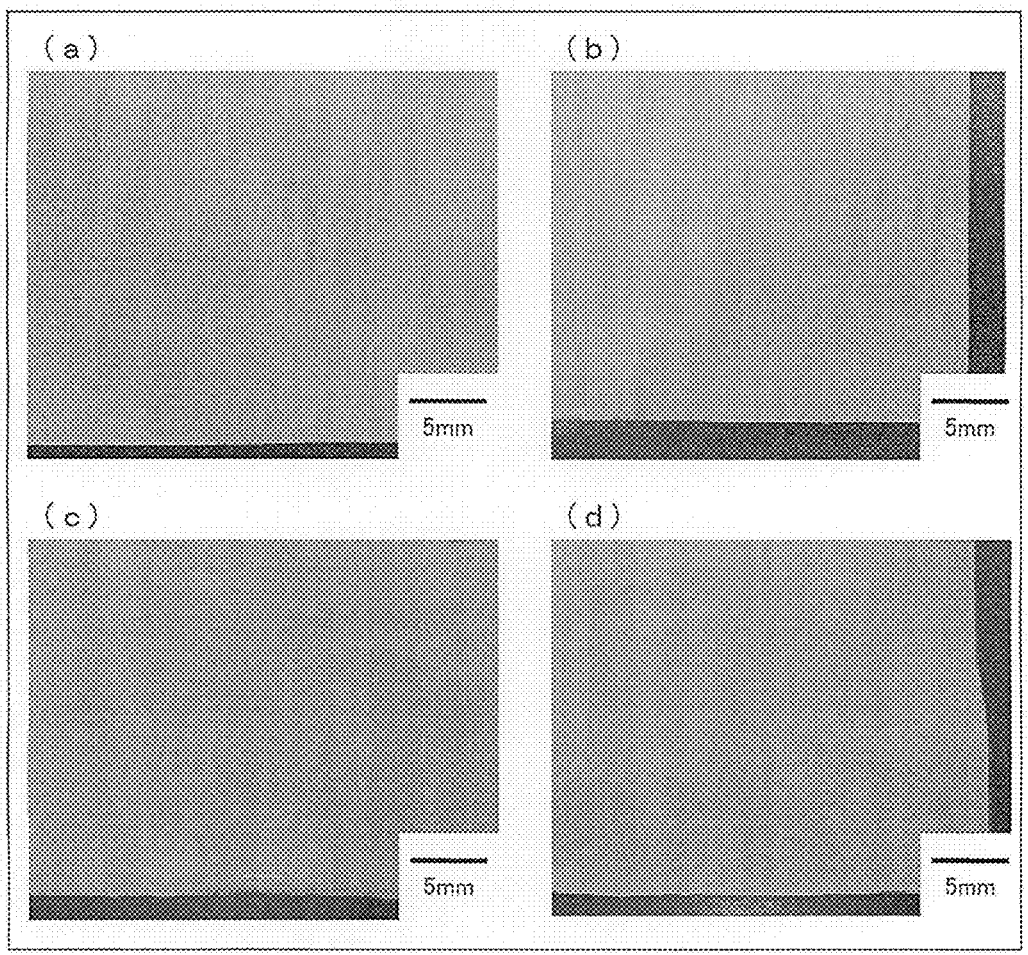

Each of (a) and (b) of FIG. 8 is a plan view showing a dried separator in accordance with Example 1. Each of (c) and (d) of FIG. 8 is a plan view showing a dried separator in accordance with Comparative Example 2.

DESCRIPTION OF EMBODIMENTS

Embodiment 1

Embodiment 1 of the present invention will be described below with reference to FIGS. 1 and 2.

The following description will discuss (i) a method for drying an electrode pair and (ii) a method for manufacturing a lithium-ion secondary battery, in accordance with Embodiment 1. Note that the method for drying an electrode pair is also one of steps of the method for manufacturing a lithium-ion secondary battery. Therefore, description of the method for manufacturing a lithium-ion secondary battery also contains description of the method for drying an electrode pair.

Hereinafter, Embodiment 1 will mainly describe the method for manufacturing a lithium-ion secondary battery. Note, however, that the present invention includes a method for manufacturing an electric double-layer capacitor. In a case where the method for manufacturing an electric double-layer capacitor is to be carried out, it is necessary that (i) a positive electrode material, a negative electrode material, separator, and electrolyte solution which are used in the method for manufacturing a lithium-ion secondary battery be replaced with (ii) a positive electrode material, a negative electrode material, separator, and electrolyte solution, respectively, which are used in the method for manufacturing an electric double-layer capacitor. This makes it possible to carry out the method for manufacturing an electric double-layer capacitor. Note that the method for drying an electrode pair can also be used in drying an electrode pair of an electric double-layer capacitor. The following description will discuss each of the steps in the method for manufacturing a lithium-ion secondary battery.

The method for manufacturing a lithium-ion secondary battery in accordance with Embodiment 1 includes the steps of: preparing a positive electrode by applying a positive-electrode active material to a current collector; preparing a negative electrode by applying a negative-electrode active material to a current collector; preparing one set of an electrode pair made up of a positive electrode, a separator, and a negative electrode which are laminated in this order or preparing sets of electrode pairs, the sets being laminated, a separator being provided between the respective sets, each of the electrode pairs being made up of a positive electrode, a separator, and a negative electrode which are laminated in this order; accommodating the electrode pair(s) in a container; injecting an electrolyte solution into the container in which the electrode pair(s) has been accommodated; sealing the container into which the electrolyte solution has been injected; and at least one of (i) drying at least one of the positive electrode(s) and the negative electrode(s) by use of a freeze-drying method and (ii) drying the container in which the electrode pair(s) has been accommodated by use of the freeze-drying method.

The following description will discuss in detail each of the steps in the method for manufacturing a lithium-ion secondary battery, with reference to (a) and (b) of FIG. 2. (a) of FIG. 2 is a flowchart showing detailed steps of the method for manufacturing a lithium-ion secondary battery. (b) of FIG. 2 is a flowchart showing details of vacuum drying of an electrode in roll form.

[Step (1): Step of Preparing Positive Electrode]

A positive electrode is prepared in the step (1). A positive electrode is obtained by forming, on the current collector, a positive-electrode active material layer containing a positive-electrode active material. Specifically, the positive electrode can be obtained by applying a positive electrode material onto a current collector and then carrying out rolling and other processing with respect to the current collector (S1 and S2) (see (a) of FIG. 2). Note that the following preparation step is merely an example step of preparing a positive electrode, and a positive electrode can be alternatively prepared by another publicly known method.

Examples of the current collector of a positive electrode encompass aluminum, stainless, nickel, titanium, and their alloys. Although varying depending on, for example, required strength of the current collector, the current collector generally has a thickness of not less than 5 μm and not more than 30 μm. A positive electrode material, to be applied to the current collector of the positive electrode, contains at least a positive-electrode active material, a conductivity aid, a binder, and a dispersing agent.

Examples of the positive-electrode active material encompass lithium manganese oxide, lithium cobalt oxide, and lithium nickel oxide. Note, however, that the positive-electrode active material is not limited to a specific one. More specifically, Li—Mn-based complex oxide such as $LiMn_2O_4$ and Li—Ni-based complex oxide such as $LiNiO_2$ are employed as the positive-electrode active material. These materials can be used alone or in combination.

The electrical conducting agent is used to improve electric conductivity of the positive electrode. Examples of the electrical conducting agent encompass carbon powder such as black lead and fibrous carbon such as carbon fiber.

The binding agent binds materials, contained in the positive electrode material, with each other. It is preferable to use polyvinylidene fluoride (PVDF) or polytetrafluoroethylene (PTFE), from viewpoints of versatility and others. Note that a thickener can be added, as necessary, to the positive electrode materials.

A slurry positive electrode material can be obtained by mixing, with a dispersing agent, the materials for the positive electrode material (S1). N-methyl-2-pyrrolidone (NMP) is suitably used as the dispersing agent, in a case where the binder is an organic binder, whereas water, warm water, or the like is used suitably in a case where the binder is an aqueous binder. A publicly known mixing device, such as a vacuum mixing device, can be used as the mixer. The positive electrode material thus obtained is then applied to a current collector by use of, for example, coater (S1). The positive electrode material is rolled by a roller and then dried. This causes a positive-electrode active material layer to be formed. In this manner, a long positive electrode can be obtained (S2). Although depending on mixed materials for positive electrode material, the positive-electrode active material layer generally has a thickness of not less than 5 μm and not more than 200 μm. The positive electrode is slit into a predetermined width by use of a slitter (S2) and then wound. This allows for a positive electrode in a roll form (S3). Although varying depending on manufacturing conditions, the positive electrode in a roll form usually has a length of not less than 30 m.

According to a conventional technique, a positive electrode in a roll form is subjected, for moisture removal, to vacuum drying. Conventionally, such drying have required 5 hours to 20 hours. On the contrary, according to the Embodiment 1, drying is not carried out at this stage from a viewpoint of reduction in the number of drying steps. This is because it is possible to satisfactorily remove moisture by use of a freeze-drying method (later described).

Note that the present invention is not necessarily limited to this. Alternatively, it is possible to dry only a positive electrode by use of the later described freeze-drying method (S20). Thus, it is possible to satisfactorily dry an electrode pair by combining freeze-drying of only a positive electrode with later described freeze-drying of the electrode pair. Moreover, it is possible to dry the electrode pair more quickly as compared with a conventional case where only a positive electrode is subjected to vacuum drying.

In a case where only a positive electrode is to be subjected to freeze-drying, the following steps S21 and S22 are preferably carried out. That is, a positive electrode in a roll form is cut into a plurality of rolls each having a given width (S21). The plurality of rolls thus cut are each unrolled into a sheet, and then subjected to freeze-drying (S22) (see (b) of FIG. 2). More specifically, a roll having a total width of a few meters is cut into a plurality of rolls each having a width of a few tens of centimeters. Thereafter, the plurality of rolls are each unrolled into a sheet, cut, and then subjected to the freeze-drying.

[Step (2): Step of Preparing Negative Electrode]

A negative electrode is obtained by forming, on the current collector, a negative-electrode active material layer containing a negative-electrode active material. Specifically, the negative electrode can be obtained by applying a negative electrode material onto a current collector and then carrying out rolling and other processing with respect to the current collector (S1 and S2) (see (a) of FIG. 2). Note that the following preparation step is merely an example step of preparing a negative electrode, and a negative electrode can be alternatively prepared by another publicly known method.

Examples of the current collector of a negative electrode encompass copper and a copper alloy. A negative electrode material, to be applied to the current collector of the negative electrode, contains at least a negative-electrode active material and a binder. Examples of the negative-electrode active material encompass a graphite-based carbon material such as natural graphite, artificial graphite, and expanded graphite, and a carbon material such as carbon black, activated carbon, carbon fiber, coke, soft carbon, and hard carbon. Note, however, that the negative-electrode active material is not limited to a specific one. More preferably, graphite such as natural graphite, artificial graphite, and expanded graphite are employed as the negative-electrode active material. These materials can be used alone or in combination.

The binder binds materials included in the negative electrode material with each other. It is preferable, from a viewpoint of versatility and other viewpoint(s), to use polyvinylidene fluoride (PVDF) or polytetrafluoroethylene (PTFE). Note that an additive or the like can be added, as necessity, to the negative electrode material. The additive is added for any purpose. For example, a phosphorus-based material is added so that a negative electrode can have flame retardancy. Examples of the other additives include a lithium-based material, a copper-based material, and a cobalt-based material.

A slurry negative electrode material can be obtained by mixing, with a dispersing agent, the materials for the negative electrode material (S1). N-methyl-2-pyrrolidone (NMP) is suitably used as the dispersing agent, in a case where the binder is an organic binder, whereas water, warm water, or the like is used suitably in a case where the binder is an aqueous binder. A publicly known mixing device, such as a vacuum mixing device, can be used as the mixer. The negative electrode material thus obtained is then applied to a current collector by use of, for example, coater (S1). The negative electrode material is rolled by a roller and then dried. This causes a negative-electrode active material layer to be formed. In this manner, a long negative electrode can be obtained (S2). The negative electrode is slit into a predetermined width by use of a slitter (S2) and then wound. This allows for a negative electrode in a roll form (S3). Although depending on mixed materials for negative electrode material, the negative-electrode active material layer generally has a thickness of not less than 5 μm and not more than 200 μm. Although varying depending on manufacturing conditions, the negative electrode in a roll form usually has a length of not less than 30 m.

As in the case of the positive electrode, the thus obtained negative electrode in a roll form is not dried in this stage. However, the present invention is not necessarily limited to this. As in the case of the positive electrode, it is possible to dry only a negative electrode by use of the later described freeze-drying method (S20).

[Step (3): Step of Preparing Electrode Pair]

In the step (3), an electrode pair is prepared by laminating (i) the positive electrode and (ii) the negative electrode, which are obtained in the steps (1) and (2), respectively, and (iii) a separator. One set of an electrode pair can be used in which one set a positive electrode, a separator, and a negative electrode are laminated in this order. Alternatively, sets of plural electrode pairs, which sets are laminated, can be used, each of the plural electrode pairs being made up of a positive electrode, a separator, and a negative electrode which are laminated in this order, a separator being provided between respective sets.

It is preferable that the step (3) and subsequent steps are carried out in a dry room whose dew point is low. This is because it is necessary to prevent moisture from being mixed into the positive electrode and the negative electrode in the step (3) and the subsequent steps, each of which step belongs to a latter half of the process of manufacturing a lithium-ion secondary battery.

The positive electrode in a roll form and negative electrode in a roll form are first cut out in a width direction of the positive and negative electrodes (S4). This makes it possible to obtain a positive electrode of a predetermined size and a negative electrode of a predetermined size. Then, the positive electrode, a separator, and the negative electrode are laminated in this order (S5), and a positive electrode tab and the positive electrode are welded together while a negative electrode tab and the negative electrode are welded together (see (a) of FIG. 2). A publicly known separator can be used as the separator. Specifically, examples of the separator encompass (i) a low density polyolefin film such as polypropylene and polyethylene and (ii) a porous film such as fluorocarbon resin.

Materials for the positive electrode tab and the negative electrode tab are not limited to specific ones. For example, copper, nickel, aluminum, and their alloys can be employed. The laminating is carried out so that the tabs are exposed, as necessary. This completes the preparation of an electrode pair in which the positive electrode, the separator, and the negative electrode are laminated in this order (S6).

[Step (4): Step of Freezing and Drying Electrode Pair by Use of Freeze-Drying Method]

In the step (4), an electrode pair, in which the positive electrode, the separator, and the negative electrode are laminated in this order, is accommodated in a container (S7) and is then frozen and dried by use of the freeze-drying method (S8) (see (a) of FIG. 2). The use of the freeze-drying method makes it possible to remove residual moisture in the electrode pair in a short time while the separator having almost no crease. According to the freeze-drying method, drying of a frozen object (the electrode pair in Embodiment 1) is carried out by subliming ice on such a frozen object. A publicly known method can be employed as the freeze-drying method. A specific example of the freeze-drying method will be described below.

A publicly known method can be employed as the freeze-drying method of Embodiment 1. The following description will discuss how a freeze-drying apparatus 1 of Embodiment 1 is configured, with reference to FIG. 1. FIG. 1 is a block diagram showing how the freeze-drying apparatus of Embodiment 1 is configured.

Figure 1:
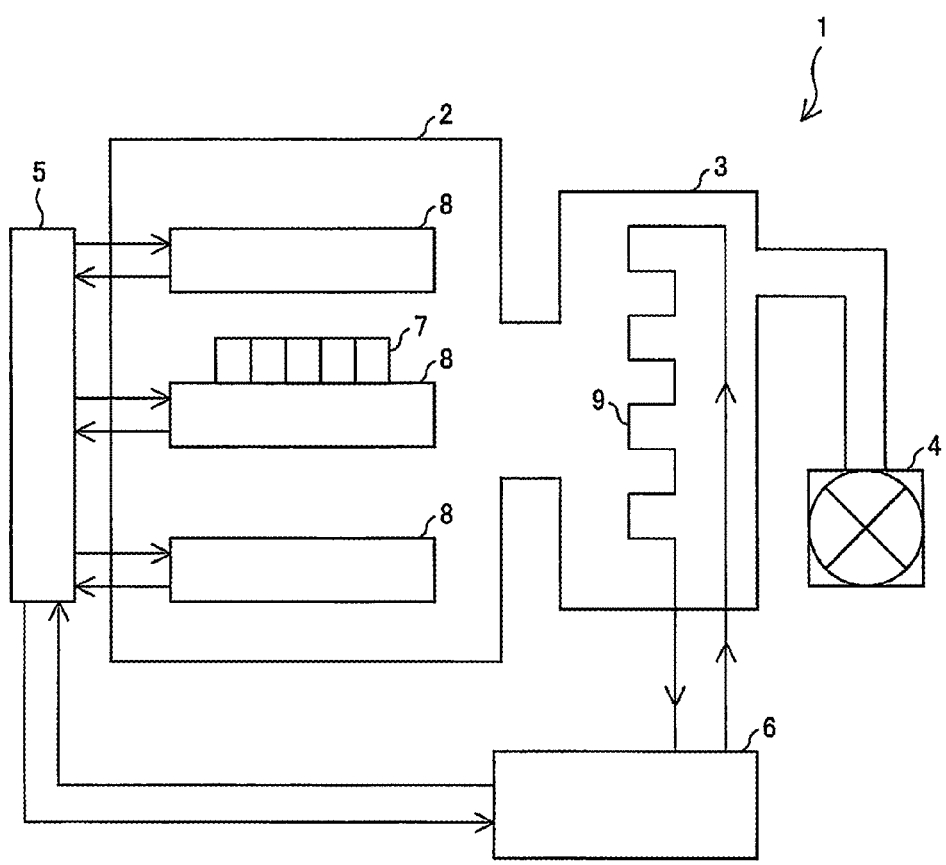
FIG. 1 is a block diagram showing one embodiment of the method for drying an electrode pair in accordance with the present invention, the block diagram showing a configuration of a freeze-drying apparatus used in the method for drying an electrode pair.

The freeze-drying apparatus 1 includes a vacuum vessel 2, a cold trap 3, a vacuum pump 4, a cooling and heating device 5, and a cooling device 6 (see FIG. 1). The vacuum vessel 2 and the cold trap 3 are configured so as to be resistant to decompressed environment.

The vacuum vessel 2 includes a cooling and heating shelf 8 on which an electrode pair 7 is placed. The cooling and heating shelf 8, which is connected to the cooling and heating device 5, can supply heat to the electrode pair 7. The cooling and heating device 5 can cool an inside of the vacuum vessel 2. Examples of the method for cooling an electrode pair by use of the cooling and heating device 5 encompass a mechanically freezing method using a refrigerant, a method using a cooling pipe, and a method by which a liquefied gas is supplied to the inside of the vacuum vessel 2. Of these methods, the method using a liquefied gas to freeze the electrode pair 7 is preferable, from a viewpoint of reduction in freezing time.

A cooling pipe 9, which is provided in the cold trap 3, communicates with the cooling device 6. The cooling pipe 9 solidifies vapor occurring during sublimation of ice on the electrode pair 7 which has been frozen by the cooling and heating device 5. Compressed gas from which the vapor has been removed is emitted from the vacuum pump 4 to an outside of the freeze-drying apparatus 1.

It is only necessary that a freezing temperature of the electrode pair 7 be not less than −196° C. and not more than 0° C. It is more preferable that the freezing temperature of the electrode pair 7 be not less than −60° C. and not more than −20° C., from a viewpoint of easiness of adjustment of the freezing temperature. These ranges of freezing temperature can be sufficiently achieved by a publicly known cooling and heating device. It is only necessary that pressure adjusted by the vacuum pump 4 be not less than 0.1 Pa and not more than 610 Pa. It is more preferable that the pressure adjusted by the vacuum pump 4 be not less than 1 Pa and not more than 100 Pa, from a viewpoint of reduction in drying time in the freeze-drying method. These ranges of pressure can be adequately achieved by a publicly known vacuum pump.

Sublimation of the ice on the electrode pair 7 causes a reduction in temperature of the electrode pair 7. As such, drying is hard to progress. In view of the circumstances, the cooling and heating shelf 8 is arranged to be heated by the cooling and heating device 5. The freeze-drying method can be sufficiently employed in a case where a drying temperature, at which the electrode pair 7 is dried by the cooling and heating shelf 8, is not lower than 0° C. and not higher than 50° C. A preferable drying temperature is not lower than 5° C. and not higher than 30° C. The drying temperature of not lower than 5° C. is less likely to prolong drying hour. Meanwhile, the drying temperature of not higher than 30° C. is preferable because crease is less likely to occur due to the fact that amount of heat applied to the separator is suppressed.

Although varying depending on factors such as a size and a type of the electrode pair 7, a drying time required in the freeze-drying method can be determined within a range in which no malfunctions occurs in a lithium-ion secondary battery (end product). Specifically, the drying time is generally 1 hour to 5 hours, and preferably 1 hour to 2 hours. Conventionally, total drying time has been at least 10 hours and sometimes about 44 hours. On the contrary, Embodiment 1 allows a reduction in total drying time to one-tenth the conventional total drying time. Such an effect is amazing. Since an electrode pair is usually dried in a high-cost dry room, the reduction in drying time allows a reduction in manufacturing costs for not only an electrode pair but also lithium-ion secondary battery (end product).

According to the freeze-drying method, crease is hard to occur in a separator provided in an electrode pair. This allows a reduction in occurrence of defective products, and ultimately allows an improvement in yield. The improvement in yield and the reduction in drying time allow manufacturing costs to be to greatly cut down. Note that, when the method for drying an electrode pair of Embodiment 1 was contrived, the inventor was concerned that an electrode pair and a separator may be physically damaged in a low-temperature environment. A freeze-drying method is used to freeze-dry vegetables and the like. In a case of freeze-drying food, minor damage to the food does not often cause a problem. On the other hand, damage to an electrode pair and a separator can cause a serious adverse effect on performance of a lithium-ion secondary battery. In contrast to the concern raised by the inventor, when the inventor conducted experiments of freeze-drying of electrode pairs including separators by use of the freeze-drying method, the experiments demonstrated that no damage was caused to the electrode pairs and the separators.

In addition, according to Embodiment 1, the freeze-drying method is carried out with respect to an electrode pair that is yet to be subjected to injection of an electrolyte solution. In view of work efficiency, it seems advantageous that the freeze-drying method is carried out at a stage where a positive electrode and a negative electrode are each in a roll form. Actually, by daring to dry an electrode pair that is yet to be subjected to injection of an electrolyte solution, an advantage will be brought about that it is possible to reduce amount of residual moisture as much as possible during injection of an electrolyte solution.

The drying time cannot be uniquely determined. This is because an amount of residual moisture varies depending on types of materials of which the electrode pair 7 is made. For example, a hydrophilic electrode pair has a large amount of residual moisture before being dried. This makes it difficult to remove moisture from the hydrophilic electrode pair by use of a freeze-drying method. In contrast, a hydrophobic electrode pair has a small amount of residual moisture before being dried. As such, moisture is likely to be removed from the hydrophobic electrode pair by use of the freeze-drying method. Although moisture is thus more likely to remain in the hydrophilic electrode pair, the hydrophilic electrode pair less affect a lithium-ion secondary battery than the hydrophobic electrode pair, provided that the hydrophilic electrode pair and the hydrophobic electrode pair have substantially same amount of residual moisture before being dried. Presumably, this is because of the following reason. It is hard for moisture to be separated from a hydrophilic electrode pair, which is high in an affinity for moisture. It is therefore hard for the moisture to act on an electrolyte solution and the like. In the present circumstances, an amount of residual moisture is determined in accordance with a required serviceable life of a battery.

Under such circumstances, it is difficult to show a specific numerical value of an amount of residual moisture in a positive electrode and a negative electrode. To stretch a point, a standard of reference of the amount of residual moisture in a positive electrode and a negative electrode is, generally, not more than 500 ppm, preferably not more than 300 ppm, and more preferably not more than 150 ppm. The amount of residual moisture in the electrode pair 7 can be measured by use of a Karl Fischer coulometric titration method. The Karl Fischer coulometric titration method excels in capability to make a measurement with high accuracy in a short time.

[Step (5): Step of Injecting Electrolyte Solution into Container]

In the step (5), an electrolyte solution is injected to a container in which a dried electrode pair is accommodated (S9) (see (a) of FIG. 2). The injection of an electrolyte solution results in preparation of a cell. The injection of an electrolyte solution can be made gradually by impregnation. Note that examples of the container include a can and aluminum-laminated film.

The electrolyte solution used in the step (5) is not specifically limited. Specific examples of the electrolyte solution include (i) cyclic carbonates such as propylene carbonate, ethylene carbonate, butylene carbonate, and vinylene carbonate, (ii) chain carbonates such as dimethyl carbonate, diethyl carbonate, ethyl methyl carbonate, and dipropyl carbonate, (iii) aliphatic carboxylic acid esters such as methyl formate, methyl acetate, ethyl propionate, (iv) γ-lactones such as γ-butyrolactone, (v) chain ether such as 2-ethoxyethane and ethoxymethoxyethane, and (vi) cyclic ethers such as tetrahydrofuran and 2-methyltetrahydrofuran. These electrolyte solutions can be used alone or in combination, by taking compatibility into consideration.

Specific examples of lithium salt dissolved in the electrolyte solution include $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$, $LiB_{10}Cl_{10}$, LiBr, LiI, LiSCN, and LiCl.

In a case where a concentration of the lithium salt in an electrolyte solution is too low, ionic conductivity in the electrolyte solution decreases. On the other hand, in a case where a concentration of the lithium salt in an electrolyte solution is too high, a viscosity of the electrolyte solution increases and ultimately causes a battery performance to be degraded. In view of the circumstances, a concentration of the lithium salt in an electrolyte solution is generally not less than 0.1 mol/L and not more than 3.0 mol/L, and preferably not less than 0.5 mol/L and not less than 2.0 mol/L. Note that a polymer electrolyte can be employed instead of a non-aqueous electrolyte solution made up of an organic solvent and lithium salt.

[Step (6): Step of Sealing Cell]

In the step (6), the cell obtained in the step (5) is sealed (S10). A lithium-ion secondary battery is thus manufactured (S11) (see (a) of FIG. 2). A shape of a container in which the cell is sealed is not specifically limited. Examples of such a shape encompass a multi-layer type, coin type, button type, sheet type, or cylindrical type. A shape to be selected can be determined, as appropriate, in accordance with applications of the lithium-ion secondary battery.

The method for manufacturing a lithium-ion secondary battery of Embodiment 1 includes the step of freezing and drying an electrode pair by use of a freeze-drying method. It is therefore possible to cut down manufacturing costs of a lithium-ion secondary battery (end product), by reducing the drying time required to dry the electrode pair.

According to the step of freezing and drying an electrode pair by use of the freeze-drying method, creases are less likely to occur in a separator provided in the electrode pair. This allows a reduction in the occurrence of defective products. It follows that yield is improved. As such, a combination of (i) the improvement in yield and (ii) the reduction in the drying time can greatly cut down manufacturing costs.

As described above, the method for drying an electrode pair in accordance with Embodiment 1 includes the steps of: preparing a positive electrode by applying a positive electrode material to a current collector; preparing a negative electrode by applying a negative electrode material to a current collector; preparing one set of an electrode pair made up of a positive electrode, a separator, and a negative electrode which are laminated in this order or preparing sets of electrode pairs, the sets being laminated, a separator being provided between the respective sets, each of the electrode pairs being made up of a positive electrode, a separator, and a negative electrode which are laminated in this order; accommodating the electrode pair(s) in a container, and at least one of (i) drying at least one of the positive electrode(s) and the negative electrode(s) by use of a freeze-drying method and (ii) drying the container in which the electrode pair(s) has been accommodated by use of the freeze-drying method.

According to the method, a freeze-drying method is used for drying an electrode pair and other elements. The freeze-drying method is arranged as below. The electrode pair and other elements are frozen and then subjected to a high vacuum. Under such a situation, when the electrode pair is heated by supply of heat for sublimation, sublimation occurs so that ice formed on the frozen electrode pair and other elements changes to a vapor. As a result, it is possible to reduce a drying time as compared with a drying time required for a conventional vacuum drying. Accordingly, manufacturing costs of electrode pairs can be cut down. Furthermore, the aforementioned drying method adopts a low drying temperature and is thus less likely to cause creases in a separator provided in the electrode pair. This allows a reduction in the occurrence of defective products. It follows that yield is improved. As such, the improvement in yield and the reduction in the drying time can greatly cut down manufacturing costs.

The method for drying an electrode pair in accordance with Embodiment 1 preferably arranged such that a drying temperature of the freeze-drying method is not lower than 5° C. and not higher than 30° C.

That is, the drying temperature of not lower than 5° C. is less likely to cause long hours of drying. Meanwhile, the drying temperature of not higher than 30° C. reduces an amount of heat applied to the separator and thus causes less creases.

The method for manufacturing a lithium-ion secondary battery in accordance with Embodiment 1 includes the steps of: preparing a positive electrode by applying a positive electrode material to a current collector; preparing a negative electrode by applying a negative electrode material to a current collector; preparing one set of an electrode pair made up of a positive electrode, a separator, and a negative electrode which are laminated in this order or preparing sets of electrode pairs, the sets being laminated, a separator being provided between the respective sets, each of the electrode pairs being made up of a positive electrode, a separator, and a negative electrode which are laminated in this order; accommodating the electrode pair(s) in a container; injecting an electrolyte solution into the container in which the electrode pair(s) has been accommodated; sealing the container into which the electrolyte solution has been injected; and at least one of (i) drying at least one of the positive electrode(s) and the negative electrode(s) by use of a freeze-drying method and (ii) drying the container in which the electrode pair(s) has been accommodated by use of the freeze-drying method.

The above-described manufacturing method includes the step of freezing and drying an electrode pair and the like by use of a freeze-drying method. It is therefore possible to cut down manufacturing costs of a lithium-ion secondary battery (end product), by reducing the drying time required to dry the electrode pair. Furthermore, according to the step of freezing and drying an electrode pair by use of the freeze-drying method, creases are less likely to occur in a separator provided in the electrode pair. This allows a reduction in the occurrence of defective products. It follows that yield is improved. As such, a combination of (i) the improvement in yield and (ii) the reduction in the drying time can greatly cut down manufacturing costs.

The method for manufacturing an electric double-layer capacitor in accordance with Embodiment 1 includes the steps of: preparing a positive electrode by applying a positive electrode material to a current collector; preparing a negative electrode by applying a negative electrode material to a current collector; preparing one set of an electrode pair made up of a positive electrode, a separator, and a negative electrode which are laminated in this order or preparing sets of electrode pairs, the sets being laminated, a separator being provided between the respective sets, each of the electrode pairs being made up of a positive electrode, a separator, and a negative electrode which are laminated in this order; accommodating the electrode pair(s) in a container; injecting an electrolyte solution into the container in which the electrode pair(s) has been accommodated; sealing the container into which the electrolyte solution has been injected; and at least one of (i) drying at least one of the positive electrode(s) and the negative electrode(s) by use of a freeze-drying method and (ii) drying the container in which the electrode pair(s) has been accommodated by use of the freeze-drying method.

The above-described manufacturing method includes the step of freezing and drying an electrode pair and the like by use of a freeze-drying method. It is therefore possible to cut down manufacturing costs of an electric double-layer capacitor (end product), by reducing the drying time required to dry the electrode pair. Furthermore, according to the step of freezing and drying an electrode pair by use of the freeze-drying method, creases are less likely to occur in a separator provided in the electrode pair. This allows a reduction in the occurrence of defective products. It follows that yield is improved. As such, a combination of (i) the improvement in yield and (ii) the reduction in the drying time can greatly cut down manufacturing costs.

Second Embodiment

The following description will discuss Embodiment 2 of the present invention with reference to FIGS. 3 through 6. Note that configurations which will not be described in Embodiment 2 are identical to those of Embodiment 1. Note also that, for convenience, identical reference numerals are given to members having functions identical to those in the drawings discussed in Embodiment 1, and descriptions on such members are omitted. FIGS. 3 through 6 illustrate arrangements of a typical lithium-ion secondary battery, a typical electric double-layer capacitor, and a typical lithium-ion capacitor. FIGS. 3 through 6 are publicly known and are referred, for description.

Embodiment 2 will discuss a method for manufacturing a lithium-ion capacitor. The lithium-ion capacitor of Embodiment 2 is different from the lithium-ion secondary battery and the electric double-layer capacitor which are described in Embodiment 1 in that metallic lithium is further provided on a negative electrode side of the electrode pair of the lithium-ion secondary battery and the electric double-layer capacitor, which electrode pair is made up of a positive electrode, a separator, and a negative electrode.

The lithium-ion secondary battery (LIB) described in Embodiment 1 is a secondary battery in which lithium ions in an electrolyte cause electrical conduction (see (a) of FIG. 3). Currently, a mainstream lithium-ion secondary battery employs, as a positive electrode, lithium metal oxide such as lithium cobalt oxide ($LiCo_2$) and employs, as a negative electrode, a carbonaceous material such as graphite. A lithium-ion secondary battery employing, as a positive electrode, lithium metal oxide such as lithium cobalt oxide ($LiCo_2$) can output an electric potential as high as 4V and therefore has an advantage of achieving a high ampere hour.

In contrast, the electric double-layer capacitor (EDLC) described in Embodiment 1 is a condenser (capacitor) having storage efficiency which has been significantly improved by utilizing a physical phenomenon of electric double layer. According to the electric double-layer capacitor, for example, activated carbon is employed as a positive electrode and a negative electrode of an electrode pair. This causes the electric double-layer capacitor ion molecules to store electric charge, unlike a secondary battery in which electric energy is stored through chemical reactions caused by an electrode. It follows that the electric double-layer capacitor has little deterioration of the electrodes due to charging and discharging. As such, it is expected that about 100,000 to 1,000,000 charge-discharge cycles can be expected, although the electric double-layer capacitor will have, in the long run, (i) a slight deterioration of electrodes when a voltage of around a withstand voltage is applied or (ii) a slight deterioration of ion molecules in an electrolyte. Note, however, that the electric double-layer capacitor has a low withstand voltage and can therefore charge a voltage of around 3V at most. As such, in a case where a high voltage is needed, some electric double-layer capacitors need to be connected in series. Since the electric double-layer capacitor is a capacitor (condenser), its electric charge is lost over time due to its self-discharge and can therefore have a storage time shorter than the secondary battery, which stores electricity through chemical reactions.

Note that (i) the electric double-layer capacitor, which requires no chemical reactions, can quickly switch between charging and discharging, and (ii) the electric double-layer capacitor can charge and discharge a large electric current due to its low internal resistance. Since the electric double-layer capacitor does not involve chemical reactions, a voltage to be subjected to charging and discharging is not constant but linearly varies in a range from 0 V to 2.5 V. The electric double-layer capacitor has an energy density of 2 Wh/L to 10 Wh/L, whereas the lithium-ion secondary battery, which is a high performance battery, has energy density of around 100 Wh/L to 500 Wh/L.

According to the electric double-layer capacitor, a positive electrode and a negative electrode form respective capacitors caused by an electric double-layer. It follows that the electric double-layer capacitor has an internal circuit configuration equivalent to two capacitors connected in series. In response to an externally applied voltage, positive ions and negative ions form, in an electrolyte, respective electric double layers on the surfaces of the respective two electrodes. The electric double layers thus formed each have a thickness corresponding to one (1) layer of molecules. In such electric double layers, electric charge is stored, and a current flows. Note that a maximum charge amount, which affects storage capacity performance, is determined in accordance with (i) an amount of externally supplied current, (ii) an amount of ions in the electrolyte, and (iii) a superficial area of the electrodes in which electric charge is stored by absorbing ions.

In contrast, according to a lithium-ion capacitor (LIC), a carbonaceous material such as activated carbon is employed as a positive electrode, and a carbonaceous material, such as graphite, to which lithium ions have been added beforehand (lithium pre-doping), is employed as a negative electrode (see (c) of FIG. 3). That is, according to the lithium-ion capacitor, an energy-density is improved by, (i) employing, as a negative electrode material, a carbonaceous material to which lithium ions can be added and are actually added and (ii) making use of a general principle of electric double-layer capacitor. In the lithium-ion capacitor, the positive electrode and the negative electrode are charged and discharged based on respective different principles, and the lithium-ion capacitor has a configuration in which a negative electrode of the lithium-ion secondary battery and a positive electrode of the electric double-layer are combined. As a result, the lithium-ion capacitor, which adopts a technique of the lithium-ion secondary battery, has an energy density of around 10 Wh/L to 30 Wh/L. Therefore, the lithium-ion capacitor can be substituted, in terms of performance, for existing electric double-layer capacitors, and is therefore expected, accordingly.

The lithium-ion capacitor 10 of Embodiment 2 includes (i), for example, three sets of electrode pairs which are laminated, each electrode pair being made up of a positive electrode 12, a separator 11, and a negative electrode 13 that are laminated in this order and (ii) a metallic lithium 14 which is further laminated on one end side of the three sets of electrode pairs. According to the lithium-ion capacitor 10, lithium ions are added to the negative electrode 13 from the metallic lithium 14 in a direction perpendicular to the negative electrode 13. Therefore, in a case lithium ions are perpendicularly added to the negative electrode 13, each porous current collector 15, serving as a current collector, is interposed between a corresponding positive electrode 12 and a corresponding negative electrode 13.

Note that, in a case where lithium ions are added to a negative electrode 13, the lithium ions can be horizontally added to the negative electrode 13 from the metallic lithium 14 (see FIG. 5). In this case, the metallic lithium 14 is not laminated on the negative electrode 13, but is provided so as to perpendicularly stand to the positive electrode 12 and the negative electrode 13 which are laminated via the separator 11.

According to (a) of FIG. 4 and FIG. 5, the lithium-ion capacitor 10 includes, for example, three sets of electrode pairs which are laminated, each electrode pair being made up of a positive electrode 12, a separator 11, and a negative electrode 13 that are laminated in this order. However, the present invention is not necessarily limited to this. For example, the lithium-ion capacitor 10 may include one laminate of the positive electrode 12, the separator 11, and the negative electrode 13 that are laminated in this order. Alternatively, the lithium-ion capacitor 10 may include laminates in any numbers other than one and three.

FIG. 6 illustrates electric potentials of the electrodes in the lithium-ion capacitor 10 during charging and discharging of the lithium-ion capacitor 10. According to the lithium-ion capacitor 10, an electric potential of the negative electrode is decreased to around a Li/Li+ electric potential by adding lithium ions to a carbonaceous material beforehand (lithium pre-doping). This allows a cell voltage to be set to 3.8 V, which is about 1.5 times higher than that of the conventional electric double-layer capacitor (EDLC), even in a case where an electric potential of the positive electrode is controlled to have a value of not higher than 4 V (see FIG. 6).

The following description will discuss a method for manufacturing the lithium-ion capacitor 10 mentioned above.

Since the lithium-ion capacitor 10 is manufactured in the substantially the same manner as the lithium-ion secondary battery (LIB) and the electric double-layer capacitor (EDLC), both of which are discussed in Embodiment 1, a detailed explanation of the method for manufacturing the lithium-ion capacitor 10 is omitted here. That is, it is possible to manufacture the lithium-ion capacitor 10 through the following steps: [Step (1): Step of Preparing Positive Electrode], [Step (2): Step of Preparing Negative Electrode], [Step (3): Step of Preparing Electrode Pair], [Step (4): Step of Freezing and Drying Electrode Pair by Use of Freeze-drying Method], [Step (5): Step of Injecting Electrolyte Solution into Container], and [Step (6): Step of Sealing Cell]. Note, here, that [Step (3): Step of Preparing Electrode Pair] requires a sub-step of laminating a metallic lithium 14 to an electrode pair on its end where a negative electrode 13 is positioned or a sub-step of providing the metallic lithium 14 next to a laminate of the positive electrode 12, the separator 11, and the negative electrode 13 that are laminated in this order, so that the metallic lithium 14 faces the positive electrode 12, the separator 11, and the negative electrode 13.

Lithium ion (Li+) pre-doping is carried out prior to an initial charge/discharge, which follows drying of electrodes, injection of an electrolyte solution, and sealing of a cell.

As described above, the method for manufacturing a lithium-ion capacitor 10 in accordance with Embodiment 2 includes the steps of: preparing a positive electrode 12 by applying a positive electrode material to a porous current collector 15; preparing a negative electrode 13 by applying a negative electrode material to a porous current collector 15; providing metallic lithium 14 to one set of an electrode pair made up of a positive electrode 12, a separator 11, and a negative electrode 13 which are laminated in this order or to sets of electrode pairs, the sets being laminated, a separator 11 being provided between the respective sets, each of the electrode pairs being made up of a positive electrode 12, a separator 11, and a negative electrode 13 which are laminated in this order; accommodating, in a container, the electrode pair(s) having the metallic lithium provided thereto; injecting an electrolyte solution into the container in which the electrode pair(s) having the metallic lithium provided thereto has been accommodated; sealing the container into which the electrolyte solution has been injected; and at least one of (i) drying at least one of the positive electrode(s) 12 and the negative electrode(s) 13 by use of a freeze-drying method and (ii) drying the container in which the electrode pair(s) has been accommodated by use of the freeze-drying method.

The above-described method includes the step of freezing and drying an electrode pair and the like by use of a freeze-drying method. It is therefore possible to cut down manufacturing costs of the lithium-ion capacitor 10 (end product), by reducing the drying time required to dry the electrode pair. Furthermore, according to the step of freezing and drying an electrode pair by use of the freeze-drying method, creases are less likely to occur in a separator 11 provided in the electrode pair. This allows a reduction in the occurrence of defective products. It follows that yield is improved. As such, a combination of (i) the improvement in yield and (ii) the reduction in the drying time can greatly cut down manufacturing costs.

The present invention is not limited to the description of the embodiments above, but may be altered by a skilled person within the scope of the claims. An embodiment based on a proper combination of technical means disclosed in different embodiments is encompassed in the technical scope of the present invention.

EXAMPLES

The following description will more specifically discuss the present invention on a basis of an example and comparative examples. However, present invention is not limited to this. Various modifications, corrections and alterations may be made by those skilled in the art without departing from the scope of the invention. Note that an amount of moisture in an electrode pair in accordance with the example and the comparative examples were measured as below.

[Amount of Residual Moisture]

An amount of residual moisture in an electrode pair before freeze-dried and an amount of residual moisture in the electrode pair after freeze-dried were measured by the Karl Fischer coulometric titration method. (1) Objects under the measurement of the amount of residual moisture obtained before freeze-drying were a positive electrode and a negative electrode each separated from an electrode pair which was yet to be dried. (2) Objects under the measurement of the amount of residual moisture obtained after freeze-drying were a positive electrode and a negative electrode each separated from a dried electrode pair.

Used as a method for measuring an amount of residual moisture was the Karl Fischer coulometric titration method, by which respective amounts of residual moisture in the positive electrode and in the negative electrode were measured. Stepwise heating was carried out at temperatures ranging from 40° C. to 200° C. in a dry room where a dew-point temperature is −60° C. and a temperature is 23° C., after which the amount of residual moisture was measured by use of a micro-quantity moisture measuring equipment (product name "CA-100"; manufactured by Mitsubishi Chemical Corporation) as a measuring equipment.

Example 1

<Preparation of Positive Electrode 1>

Lithium cobalt oxide, which serves as a positive-electrode active material, acetylene black, which serves as an electrical conducting agent, polyvinylidene fluoride (PVDF), which serves as a binder, and N-methyl-2-pyrrolidone (NMP), which serves as a dispersing agent, were used as materials for a positive electrode material. These materials were mixed with one another by use of a vacuum mixing device, thereby obtaining a slurry positive electrode material.

Next, the positive electrode material was applied, by use of a coater, to an aluminum foil, which serves as a current collector. The positive electrode material was further rolled by use of a roller and then dried, so that a positive electrode in a roll form was obtained. Thereafter, the positive electrode in a roll form was slit along its length direction.

The positive electrode thus slit was cut along its width in a dry room (at a temperature of 23° C. and at a dew point of −60° C.), so that a positive electrode piece having a size of 40 mm×60 mm was obtained.

<Preparation of Negative Electrode 1>

Natural graphite, which serves as a negative-electrode active material, PVDF, which serves as a binding agent, acetylene black, which serves as an electrical conducting agent, and N-methyl-2-pyrrolidone (NMP), which serves as a dispersing agent, were used as materials for a negative electrode material. These materials were mixed with one another by use of a vacuum mixing device, thereby obtaining a slurry negative electrode material.

Next, the negative electrode material was applied, by use of a coater, to a copper foil, which serves as a current collector. The negative electrode material was further rolled by use of a roller and then dried, so that a negative electrode in a roll form was obtained. Thereafter, the negative electrode in a roll form was slit along its length direction.

The negative electrode which had been slit was cut in the across-the-width direction at a dry room (which has a temperature of 23° C. and a dew point of −60° C.) so that a negative electrode piece identical in size to the positive electrode 1 was obtained.

<Preparation of Negative Electrode 2>

A negative electrode 2 was prepared as in the same manner as the negative electrode 1, except that the negative-electrode active material as used in the preparation of the negative electrode 1 was replaced with artificial graphite.

<Preparation of Electrode Pair>

The positive electrode 1, a separator, and the negative electrode 1 were laminated on top of each other. As the separator, "Celgard#2400" (manufactured by Celgard) was used. A positive electrode tab and a negative electrode tab were welded to the positive electrode and the negative electrode, respectively. Furthermore, the tabs were laminated so that an electrode pair 1 was prepared. In addition, an electrode pair 2 was prepared in the same manner except that the negative electrode 2 was replaced with the negative electrode 1.

<Freeze-Drying of Electrode Pair>

The electrode pairs 1 and 2 were freeze-dried by use of a freeze-drying apparatus which is identical in structure to the freeze-drying apparatus 1 shown in FIG. 1.

Firstly, the electrode pairs 1 and 2 were placed in a cooling and heating shelf provided inside the freeze-drying apparatus. Then, an interior of a vacuum vessel was cooled to −40° C. by use of a heating and cooling device, and a pressure inside the vacuum vessel was reduced to 10 Pa by use of a vacuum pump. A temperature of a cooling pipe was maintained by use of a cooling device. Under this environment, the freeze-drying method was carried out while a temperature of the cooling and heating shelf was set at 30° C. One hour later, respective amounts of residual moisture in the positive electrode 1, the negative electrode 1, and the negative electrode 2 were measured. Results are shown in Table 1.

TABLE 1

| Electrode | Active material | Residual moisture amount before drying | Residual moisture amount after drying | Drying time |
|---|---|---|---|---|
| Positive electrode 1 | Cobalt-based | 1990 ppm | 306 ppm | 1 hour |
| Negative electrode 1 | Natural graphite | 1440 ppm | 293 ppm | 1 hour |
| Negative electrode 2 | Artificial graphite | 400 ppm | 13 ppm | 1 hour |

Amounts of moisture in the respective positive and negative electrodes shown in Table 1 meet standards for normal operations of the positive electrode and negative electrodes used in a lithium-ion secondary battery. Comparison between the negative electrode 1 and the negative electrode 2 shows that amounts of residual moisture obtained before and after drying are smaller in the negative electrode 2, in which artificial graphite was used. It can be considered that such a difference results from a difference in crystalline between natural graphite and artificial graphite.

FIG. 7 shows a relationship between a drying time and an amount of residual moisture with respect to the positive electrode 1 and the negative electrode 1 in accordance with the freeze-drying method. In FIG. 7, a dashed line indicates the positive electrode 1 in accordance with Embodiment 1, and a solid line indicates the negative electrode 1 in accordance with Embodiment 1. As indicated by specific numerical values in Table 1, the respective amounts of residual moisture in the electrodes reached, after one hour has elapsed since start of the drying, standards required for practical use in a lithium-ion secondary battery (an end product). Thereafter, the amount of residual moisture in the positive electrode 1 leveled off after five hours have elapsed since the start of the drying, and the amount of residual moisture in the negative electrode 1 leveled off after one hour has elapsed since the start of the drying. Finally, after ten hours have elapsed since the start of the drying, the amounts of residual moisture in the positive electrode 1 and the negative electrode 1 both became almost constant. This demonstrates that a satisfactory drying result was obtained just one hour later.

Comparative Example 1

An electrode pair 1 prepared as in Example 1 was subjected to vacuum drying under a condition that a temperature is 150° C. and a pressure is 10 Pa. As a result, after a lapse of ten hours from the start of the drying, respective amounts of residual moisture in a positive electrode 1 and a negative electrode 1 reached the same values as obtained in Example 1, which values are shown in Table 1. This shows that the drying time was significantly reduced in Example 1, as compared with Comparative Example 1.

Comparative Example 2

Vacuum drying was carried out under the same condition as the condition of Comparative Example 1 except that the temperature was changed to 80° C. and the pressure was changed to 10 Pa. The temperature of 80° C. is a value equal to or lower than a heatproof temperature of the separator.

(a) and (b) of FIG. 8 are plain views showing respective separators of the electrode pairs 1 and 2 after dried in Example 1, respectively. (c) and (d) of FIG. 8 are plain views showing respective separators of two electrode pairs 1 after dried in Comparative Example 2. In Example 1, no creases were found in the separators and the separators remained flat (see (a) and (b) of FIG. 8). The drying method in accordance with the present embodiment realizes a high yield while hardly bringing decreased yield caused by creases of a separator.

In contrast, creases were found in the separators in Comparative Example 2 (see (c) and (d) of FIG. 8). This shows that vacuum drying causes creases in a separator even if a drying temperature is set to be low. Creases in a separator, in turn, cause decreases in yields of an electrode pair and a lithium-ion secondary battery (end product). Comparison of both of the results clearly shows superiority of the method for drying an electrode pair in accordance with the present embodiment.

INDUSTRIAL APPLICABILITY

A method for drying an electrode pair in accordance with the present invention makes it possible to dry an electrode pair(s) in a short time, and thus is applicable to a field of manufacturing electrode pairs. The method is applicable to, for example, a method for manufacturing a lithium-ion secondary battery, a method for manufacturing an electric double-layer capacitor, and a method for manufacturing a lithium-ion capacitor.

REFERENCE SIGNS LIST

1 Freeze-drying apparatus
2 Vacuum vessel
3 Cold trap
4 Vacuum pump
5 Cooling and heating device
6 Cooling device
7 Electrode pair
8 Cooling and heating shelf
9 Cooling pipe
10 Lithium-ion capacitor
11 Separator
12 Positive electrode
13 Negative electrode
14 Metallic lithium
15 Porous current collector (Current collector)

The invention claimed is:

1. A method for drying an electrode pair, comprising the steps of:
    preparing a positive electrode by applying a positive electrode material to a current collector;
    preparing a negative electrode by applying a negative electrode material to a current collector;
    preparing one set of an electrode pair made up of a positive electrode, a separator, and a negative electrode which are laminated in this order or preparing sets of electrode pairs, the sets being laminated, a separator being provided between the respective sets, each of the electrode pairs being made up of a positive electrode, a separator, and a negative electrode which are laminated in this order;
    accommodating the electrode pair(s) in a container, and
    performing within a vacuum vessel a freeze-drying method which includes at least one of (i) drying at least one of the positive electrode(s) and the negative electrode(s) within the vacuum vessel and (ii) drying the electrode pair(s) accommodated in the container within the vacuum vessel,
    wherein the freeze-drying method is carried out so that (i) a temperature within the vacuum vessel is not less than −196° C. and not more than 0° C., (ii) a pressure within the vacuum vessel is not less than 0.1 Pa and not more than 610 Pa, and (iii) a temperature of an electrode to be dried is not lower than 0° C. and not higher than 50° C.

2. The method of claim 1, wherein the freeze-drying method is carried out so that a drying time within the vacuum vessel is 1 hour to 5 hours.

3. The method of claim 2, wherein the drying time is 1 hour to 2 hours.

4. The method of claim 1, wherein the freeze-drying method is carried out so that the temperature within the vacuum vessel is not less than −60° C. and not more than −20° C.

5. The method of claim 1, wherein the freeze-drying method is carried out so that the pressure within the vacuum vessel is not less than 1 Pa and not more than 100 Pa.

6. The method of claim 1, wherein the freeze-drying method is carried out so that the temperature of the electrode to be dried is not lower than 5° C. and not higher than 30° C.

* * * * *

UNITED STATES PATENT AND TRADEMARK OFFICE
CERTIFICATE OF CORRECTION

| | | |
|---|---|---|
| PATENT NO. | : 10,381,164 B2 | Page 1 of 1 |
| APPLICATION NO. | : 14/972527 | |
| DATED | : August 13, 2019 | |
| INVENTOR(S) | : Junichi Inahara | |

It is certified that error appears in the above-identified patent and that said Letters Patent is hereby corrected as shown below:

On the Title Page

(73) Assignee should read: ESPEC Corp., Osaka (JP)

Signed and Sealed this
Twelfth Day of May, 2020

Andrei Iancu
*Director of the United States Patent and Trademark Office*